(12) United States Patent
Spallek et al.

(10) Patent No.: US 12,475,811 B2
(45) Date of Patent: Nov. 18, 2025

(54) MEDICAL TRAINING MODEL COMPRISING ADDITIVELY MANUFACTURED CUSTOMISABLE VESSEL MODELS

(71) Applicants: TECHNISCHE UNIVERSITÄT HAMBURG, Hamburg (DE); TUTECH INNOVATION GMBH, Hamburg (DE)

(72) Inventors: Johanna Spallek, Hamburg (DE); Dieter Krause, Buchholz (DE)

(73) Assignees: TECHNISCHE UNIVERSITÄT HAMBURG, Hamburg (DE); TUTECH INNOVATION GMBH, Hamburg (DE)

( * ) Notice: Subject to any disclaimer, the term of this patent is extended or adjusted under 35 U.S.C. 154(b) by 768 days.

(21) Appl. No.: 17/778,287

(22) PCT Filed: Nov. 16, 2020

(86) PCT No.: PCT/EP2020/082199
§ 371 (c)(1),
(2) Date: May 19, 2022

(87) PCT Pub. No.: WO2021/099245
PCT Pub. Date: May 27, 2021

(65) Prior Publication Data
US 2022/0392376 A1    Dec. 8, 2022

(30) Foreign Application Priority Data
Nov. 20, 2019  (DE) .................. 10 2019 008 058.0

(51) Int. Cl.
*G09B 23/30* (2006.01)
(52) U.S. Cl.
CPC .................. *G09B 23/303* (2013.01)

(58) Field of Classification Search
CPC .................................................. G09B 23/303
See application file for complete search history.

(56) References Cited

U.S. PATENT DOCUMENTS

| 4,076,285 A |   | 2/1978 | Martinez |           |
|-------------|---|--------|----------|-----------|
| 5,873,386 A | * | 2/1999 | Arosio   | F16L 37/30 |
|             |   |        |          | 137/614.02 |

(Continued)

FOREIGN PATENT DOCUMENTS

| DE | 202012011452 U1 | 2/2013 |
| DE | 10 2013 220 640 A1 | 6/2014 |

(Continued)

OTHER PUBLICATIONS

Development of generatively manufactured and customizable vascular models (Original) (Year: 2014).*

(Continued)

*Primary Examiner* — Peter S Vasat
*Assistant Examiner* — Selwa A Alsomairy
(74) *Attorney, Agent, or Firm* — Kilpatrick Townsend & Stockton LLP (57) ABSTRACT

A medical training model includes a base frame, a fluid system arranged on the frame and configured to simulate a blood circulation replacement system, and at least one additively manufactured individualized vessel model with a patient-specific replicated lumen. The vessel model may be interchangeably connectable to the fluid system by at least one hydraulic quick coupling having coupling pieces such as a plug and a sleeve or bushing. Each coupling piece may contain an inner flow channel, and at least one coupling piece is designed as an adapter with a diameter-changing flow channel course that transitions from the patient-specific lumen to a standardized coupling connection opening. The flow channel course may include a conical region providing a smooth, edgeless transition between differing diameters, (Continued)

with the conical region formed as a hollow shaft truncated cone for flat bearing and sealing when the coupling pieces are locked together.

7 Claims, 5 Drawing Sheets

(56) References Cited

U.S. PATENT DOCUMENTS

| | | | | |
|---|---|---|---|---|
| 2013/0233397 A1* | 9/2013 | McCloskey | ............ | A61F 2/2472 137/12 |
| 2013/0288218 A1 | 10/2013 | Mallin et al. | | |
| 2016/0051806 A1* | 2/2016 | Goldsmith | ............... | A61N 1/00 604/21 |

FOREIGN PATENT DOCUMENTS

| | | | | |
|---|---|---|---|---|
| DE | 102014007047 A1 * | 11/2015 | ............ | A61M 39/16 |
| DE | 10 2016 108 152 A1 | 11/2017 | | |
| DE | 202017006757 U1 | 4/2018 | | |
| EP | 0158030 A1 | 10/1985 | | |
| WO | 2007/025494 A1 | 3/2007 | | |
| WO | 2021/099245 A1 | 5/2021 | | |

OTHER PUBLICATIONS

Development of generatively manufactured and customizable vascular models (Translation) (Year: 2014).*
Fabrication and Assessment of 3D Printed Anatomical Models (Year: 2015).*
Process types of customisation and personalisation in design for additive manufacturing applied to vascular models (Year: 2016).*
International Search Report for PCT/EP2020/082199 mailed Feb. 23, 2021, all pages.
Johanna Spallek et al., "Design for Mass Adaptation of the Neurointerventional Training Model HANNES with Patient-Specific Aneurysm Models" *Proceedings of the Design Society: International Conference on Engineering Design*, vol. 1, No. 1, Jul. 1, 2019, pp. 897-906 DOI: 10.1017/dsi.2019.94 XP055763807, chapter 4.3.1, 4.3.2; figures 2-5.
Johanna Spallek et al., "Process Types of Customisation and Personalisation in Design for Additive Manufacturing Applied to Vascular Models" *PROCEDIA CIRP*, NL, vol. 50, Jan. 1, 2016, pp. 281-286 DOI: 10.1016/j.procir.2016.05.022 ISSN: 2212-8271, XP055763805 text in the respective columns below figures 3 and 4.
German Office Action dated Jun. 24, 2020, 18 pages.
German Office Action dated Sep. 30, 2020, 21 pages.

* cited by examiner

MEDICAL TRAINING MODEL COMPRISING ADDITIVELY MANUFACTURED CUSTOMISABLE VESSEL MODELS

The invention relates to a medical training model according to the preamble of claim 1.

A medical training model offers a variety of different customer needs and can be used, among other things, for the education and training of medical professionals in the minimally invasive catheter treatment of blood vessel diseases such as aneurysms (bulging of the vessel wall). This replaces the animal experiments used for treatment training and education and provides a realistic representation of human anatomy through a re-enactment of relevant vessels.

From DE 20 2017 006 757 U1, a training model for training surgeons and for testing complicated surgical procedures to increase the chances of success of a surgical procedure in various surgical disciplines is known. The training model allows individual adaptation based on variably composable components. For this purpose, the training model comprises an exchangeable training region of an anatomical replica as well as a storage medium for patient data. The exchangeable training region corresponds to the surgical field for the user of the training model, in which he practices surgical procedures, including minimally invasive methods. The exchangeable training region represents an anatomical replica of a body region. The exchangeable training region can be produced using additive manufacturing processes based on three-dimensional patient data, which means that each training session can be individually designed and performed. Blood vessels such as the jugular vein and the carotid artery can also be reproduced.

In addition, a storage medium can be used to store individual patient data, such as the patient's medical records, so that the surgeon can get an idea of the upcoming training to be performed before the training intervention. The surgical procedure can also be monitored and controlled electronically by means of signal transmission.

For correct and permanent positioning of the exercise region, it is detachably connected to the anatomical replica of a body part.

Replicas of a circulatory system with a pulsating flow are missing. This is particularly disadvantageous if the exercise region concerns the blood vascular system of a human being. In the vascular system, the arterial pulse propagates as a wave of a volume flow with pressure values in the range of, for example, 8 to 17 kPa. Therefore, there is also a lack of a sealing connection of the patient-specific exercise region to the training model.

From DE 202012011452 U1 a neurosurgical training model is known that allows virtual surgery planning. The work steps of the training are recorded and virtually mapped on a phantom and compared and evaluated with a previously defined reference access. As an overall system consisting of hardware, software and processed data sets, the training system enables the planning and simulation of selected brain tumor operations and can thus contribute significantly to learning, understanding and training the procedures of such operations.

The disadvantage of such a training phantom system for neurosurgical interventions is that it does not come very close to the real conditions in an operating room. The medical instruments differ from those used in reality. Particularly in neurosurgery, however, the training of endoscopic procedures on detailed replicas of human anatomy is desirable, since the demands on the surgeon are particularly high here.

It is therefore an object of the invention to provide a training model with the aid of which a training situation can be created in a simple manner in connection with the current areas of the arterial blood supply to the brain, which comes as close as possible to the corresponding real process situations. At the same time, this advantage is to be made possible by a device that is simple and inexpensive to manufacture.

This object is achieved by the features of claim 1.

Hereby, a medical training model for treatment readjustment of minimally invasive catheter treatments, for example intracranial aneurysms, is created. For this purpose, a replica of the human vascular tree relevant for the minimally invasive treatment of intracranial aneurysms is created with a blood circulation system and the possibility to adjust individual vessel sections for the realization of different training scenarios in a training region system is realized. The structure of the medical training model can be modular and can consist of standardized components (used in every training scenario), variant components (training scenario defining components) and patient specific components (adapted according to an original patient specific anatomy). Preferably, the medical training model is, for example, a neurointerventional training model.

According to the invention, a simple integration with a fast exchangeability of patient-specific vascular geometries in combination with the simulation of a blood circulation system is achieved so that a simple, realistic configuration of different and individual training scenarios of medical, in particular neuro-interventional treatments is possible.

The training model can also at least partially include the neuroanatomy, according to which the arterial blood supply to the brain is via the vertebral arteries (so-called posterior flow area) and the internal carotid artery. Both flow areas are connected, by means of the circulus arteriosus cerebri (willisii). The circulus arteriosus cerebri (willisii) represents an anastomotic circuit between the carotid flow area and the vertebrobasilar flow area. The blood supply to both cerebral hemispheres and the stromal areas is connected at the base of the brain by the arteria communicans anteriores and the arteriae communicantes posteriores. These vascular connections and other adjacent sites of division of arteries are of particular clinical importance, since they represent the main localization of pathological vascular dilatations (aneurysms), which can lead to a life-threatening subarachnoid hemorrhage if they rupture. The aneurysms occur there especially at the dividing points of the arteries.

With the quick coupling according to the invention, the training model enables a patient-specific anatomical simulation of sections of arterial flow-pathways of the brain and forms a connecting device for one or more additively or generatively manufactured vascular models, in particular aneurysms, whose neuroradiological treatment is required. The dividing points of the arteries can be replicated and combined with patient-specific aneurysms. The positioning of multiple flow paths in a training system is greatly simplified. Consequently, the training model replicates the vascular tree relevant for minimally invasive vascular treatment with the possibility of exchanging individual, possibly patient-original geometries, and can thereby offer a blood circulation replacement system.

The standardization of the coupling connection openings guides the lumens of the patient-specific vessels to a selectable clear width, for which purpose an adapter is, for example, conically reducing or conically widening in a transition area, always with the aim of creating an edge-free transition. The quick coupling can thereby provide a storage area via the coupling pieces for a variance in the standardization of the coupling connection opening, so that, if necessary, identical mechanical connections can be equipped with differently standardized clear widths of the coupling connection opening. A significant advantage is that different typical diameters of the vessels can be adjusted depending on the position of the coupling. This is possible with these differently standardized widths. Closer to the heart, the vessel diameters are usually larger than downstream. Furthermore, vascular diseases of children, adolescents and adults with vessel lumens of different sizes can be simulated on a single training model.

Internal geometries are therefore individually adaptable, while the external geometry can be selected uniformly for simple and standardized assembly. The adapters according to the invention can be additively manufactured and integrated directly on the vessel model. Suitable seals can be used for a sealing connection of the coupling bodies.

Another advantage is the possibility of using real instruments, realistic probing and treatment of cerebral aneurysms, and recreation of physiological properties such as temperature, blood flow and pulsation. The high geometric freedom of additive or generative methods allows the production of vessel models that are an exact three-dimensional replica of patient-specific intracranial aneurysms with the adjacent vessel interiors.

Further embodiments and advantages of the invention can be found in the following description and the dependent claims.

The invention is explained in more detail below with reference to the embodiments shown in the accompanying figures.

Figure 1:
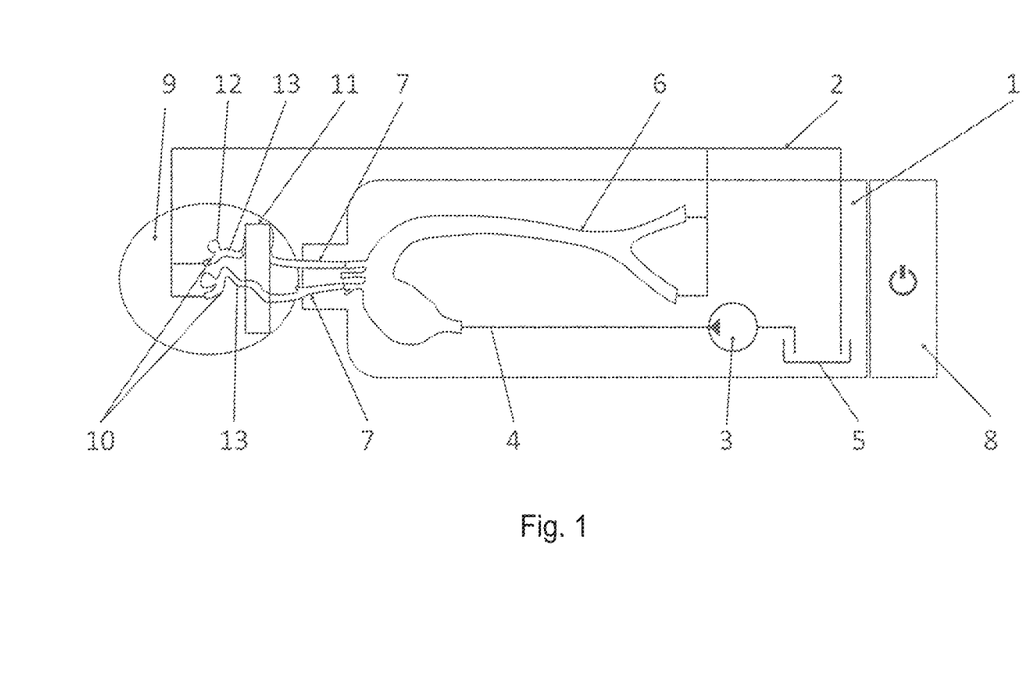
FIG. 1 schematically shows a neuro-interventional training model HANNES with a modular design, FIG. 2 schematically shows a perspective view of an individual vessel model with adapter as coupling piece according to a first mechanical connection, FIG. 3 schematically shows a perspective view of an individual vessel model with adapter as coupling piece according to a second mechanical connection, FIG. 4 schematically shows a section of assembled coupling pieces as adapters of patient-specific geometries (individual) with standardized coupling connection opening, FIG. 5 schematically shows a modular vascular tree with adapter positioning in the HANNES training model.

As FIG. 1 shows, the invention relates to a medical, for example a neuro-interventional training model with a modular basic structure, such as that of the training model HANNES (HAmburger ANatomisches NEurointerventional Simulation Model). HANNES was developed by the Technical University of Hamburg as part of the ELBE-NTM project, funded by the Federal Ministry of Education and Research of the Federal Republic of Germany as part of the BMBF funding measure "Alternative Methods to Animal Experiments".

The modular basic structure of the training model allows the combination of modules, namely standardized or variant modules with exchangeable individualized modules. A major focus is on the integration of patient-specific and individualized geometries. Patient-specific aneurysm models, for example, can be additively made on the basis of medical image data from patients in a standardized individualization process, i.e. in the layer construction process or 3D printing, can be manufactured. A portfolio of different aneurysm geometries can be provided as a basis for training.

The modular basic structure of the training model comprises a base frame 1 which is used for attaching and/or positioning further components and whose dimensions can be adapted to the size of a human body. A fluid system 2 is arranged on the base frame 1, which simulates a blood circulation system. The fluid system 2 comprises at least one pump 3 and a branched flow path 4 formed by hoses and/or other lines, a forward flow which leads via a return flow back into a tank 5 from which the pump 3 delivers, for example. The flow path 4 replicates at least one vascular tree 6, from which preferably several tubular neuro-flow paths 7 branch off for arterial blood supply, for example, to the brain and the vascular models 10. Preferably, as in nature, three paths can branch off from the aorta, which then become four blood-supplying vessels to the brain, namely two at the front and two at the back, and thus four in total.

The pump 3 delivers an adjustable volume flow, which flows into the vascular tree 6 via the flow path 4 belonging to the fluid system 2. By means of valves not shown and, for example, bypass systems, pressure pulsations similar to human blood pressure can be generated. A control unit 8 can be used to set pulse, volumetric flow and, for example, temperature.

A head model 9 is attached to the base frame 1 on the head side. A connection can be made via a skull base model 11, which can be integrated in the head model 9, and the neuro-flow pathways 7. The skull base model 11 can simulate the skull base with an integrated vascular course and an integrated holder.

The head model 9 and the skull base model 11 enable the positioning of one or more, here for example two, vessel models 10, in particular so-called aneurysm models, in which the vessel models 10 have one or more bulges 12. For this purpose, the vessel model or models 10 can be connected to the neuro-flow pathway 7 via the holder 11. The head model 9 is variant interchangeable. The fluid system 2 replicates a blood circulation replacement system.

The respective vessel model 10 is patient-specifically individualized and can be detachably and exchangeably coupled on the input side to the fluid system 2 and its neuro-flow path 7 via at least one quick coupling 14 (shown in FIGS. 2-5). The connection technology is described in detail below. The respective vessel model 10 can thus be interchangeably positioned in a training region, here the head model 9 of the training model, whereby the number and the respective geometries of the vessel models 10 can be selected individually and patient-specifically according to the clinical picture, which also includes in particular the individual inner geometries of the lumens of the vessels 13 upstream of the pathological saccular area 12.

Figure 2:
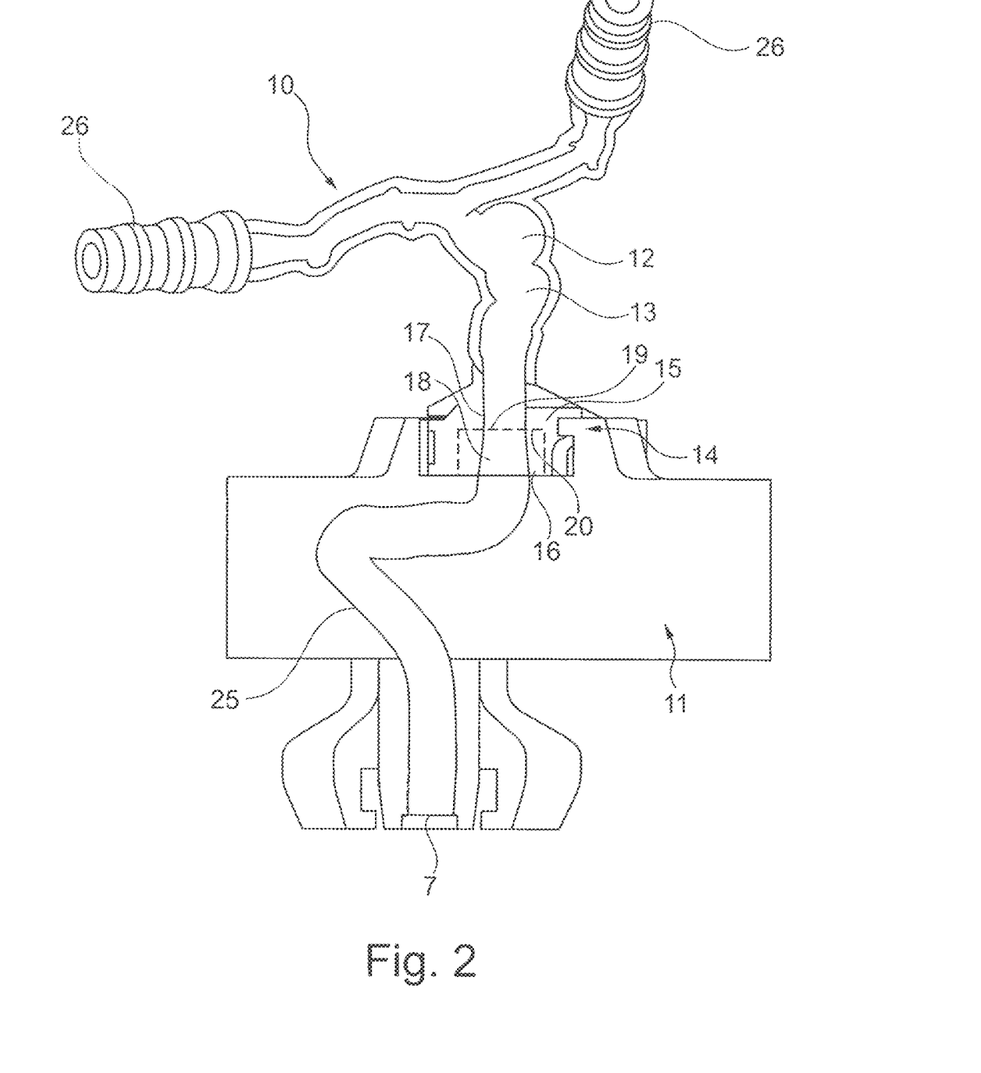
Figure 3:
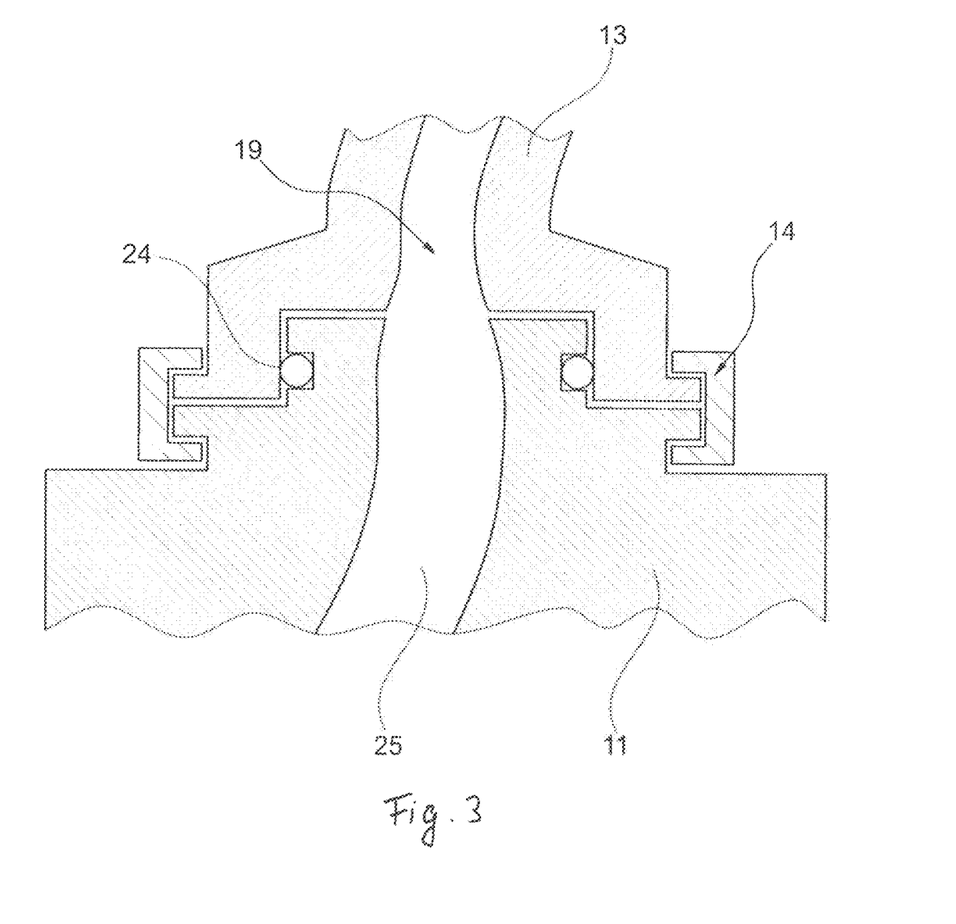
Figure 4:
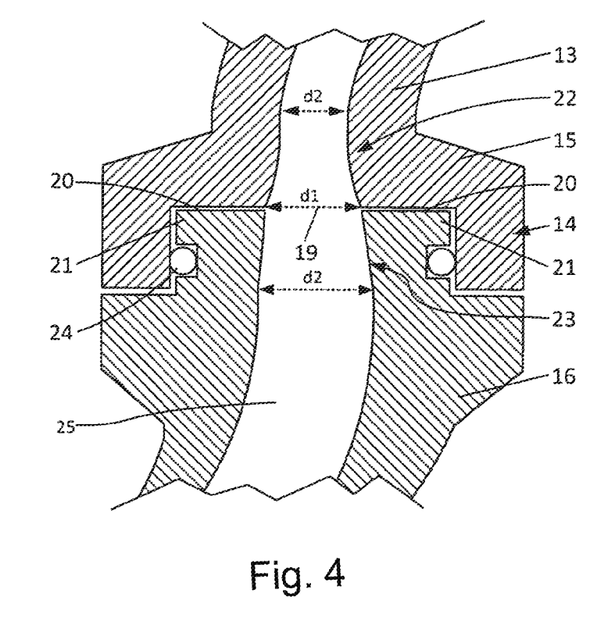

FIGS. 2 to 4 show the connection technique according to the invention in a medical, in particular neuro-interventional, training model with at least one additively or generatively manufactured, customizable vascular model 10 (shown in FIG. 2), which is interchangeably connectable in at least one exercise region to the fluid system 2 (shown in FIG. 1) with neuro-flow pathway 7 (shown in FIG. 2) of an anatomically replicated training model with the respective patient-specific replicated lumen of a vessel 13, which is preferably formed upstream of a saccular aneurysm 12 (shown in FIG. 2).

The vessel model 10, which is replicated with a patient-specific geometry, can be connected to the fluid system 2 via a hydraulic quick-release coupling 14. The hydraulic quick coupling 14 comprises as coupling pieces 15, 16 a plug and a sleeve or bushing, which are each provided with an internal flow channel 17, 18 for tight connection when the coupling pieces 15, 16 are joined together. In each case, one of the coupling pieces 15 and/or 16 is designed as an adapter on the connection side of the vessel model 10 with a diameter-changing flow channel course 17, which can open the lumen of the vessel 13 of the patient-specific vessel model 10 to a standardized coupling port opening 19. The coupling port opening 19 has, for example, a diameter d1 which is larger or smaller than a clear width d2, where d2 need not be circular, of a lumen of a vessel 13, the so-called individual internal geometry, of a vessel model 10. By means of the coupling piece 15, the diameter d2 of the individual internal geometry is converted into the standardized diameter d1 of the coupling port opening 19.

The additive manufacturing of a vessel model 10 thus preferably also includes the additive manufacturing of an adapter which, as a coupling piece 15, provides a widening or reducing transition 22 to a standardized coupling connection opening 19 while changing the individual diameter d2 to a standardized diameter d1. An automatic guide is provided.

The internal geometry can thus be designed to suit the individual patient without having to influence the external geometry of a sealing mechanical connection. The type of mechanical connection can then be freely selected and can, for example, be a plug-in connection, as shown in FIG. 3, or be designed as a turning mechanism or bayonet connection, etc.

As FIG. 3 shows, the plug and socket of a quick coupling 14 can be designed in such a way that, in addition to pushing the plug into the respective socket, twisting can also be provided with tightening ramps at the edges. It is further advantageous if the quick-connect coupling is a flat-sealing or flush-sealing coupling 14. In the flat sealing coupling, the plug and socket are constructed such that when the plug is separated from the socket, both the plug and socket have flat end surfaces. Advantageously, the plug and socket each have an overall cylindrical shape, which facilitates the insertion of sealing rings 24 between the outer wall of the plug and the inner wall of the socket.

As shown in particular in FIG. 4, the coupling pieces 15, 16 can form abutting coupling pieces 15, 16 in a locked coupling position, which form end stops 21 for an opening diameter variance of the normalized coupling connection opening 19. This means that the standardized coupling connection opening 19 can be integrated into the training model with different diameters d1. There is virtually a reserve area 20 for a variable standardized diameter d1, which is to be selected the same for the coupling pieces 15, 16 for a preferably recess-free solution.

Different vessel diameters in the course of a flow can be simulated. The clear width of a lumen of a patient-specific vessel 13 is different for children, adolescents and adults of female, male or diverse sex and can be taken into account when selecting the size of the diameter d1 of a standardized coupling port 19.

The quick coupling 14 can be designed as a manually releasable mechanical connection, with the coupling pieces 15, 16 each being arranged on the side facing the other coupling piece may have a sealing surface and a sealing ring 24 may be arranged between the sealing surfaces.

The coupling pieces 15, 16 can have a flow channel course 17, 18 with a conical region as an edgeless transition 22 between the lumen of the vessel 13 and the standardized coupling connection opening 19. The plug and socket/sleeve may be cylindrical in shape and each accommodate an axial flow channel. The tapered portion of the transition 22 may be conically reducing and/or widening as a hollow shaft frustum for a planar abutment against the reserve surface 20. A positive or negative slope of a flank angle of the tapered region is selectable for forming a tapered transition piece between two sections of different nominal sizes with face contact over a collar of the transition 22.

The quick couplings 14 can be designed as flat-sealing or flush-sealing couplings.

One or more of the vascular models 10 can be detachably anatomically positioned on at least one skull base model 11 with integrable holder and/or also directly on neuro-flow pathway 7, for which purpose this holder 11 can be designed as a solid block with internal channels 25 inversely reproducing human arteries with patient-specific geometry, which can be guided outwards at both ends and can terminate in respective connection points forming a coupling piece 16. The holder 11 may be made from a lost mold potting compound or by an additive manufacturing process. Here, too, there is a transition region 23 from the patient-specific lumen to the standardized coupling connection opening 19. What has been explained for the transition 22 applies accordingly to the transition 23, as shown in particular in FIG. 4. A smooth and edge-free transition of the inner geometry can thus be ensured.

Figure 5:
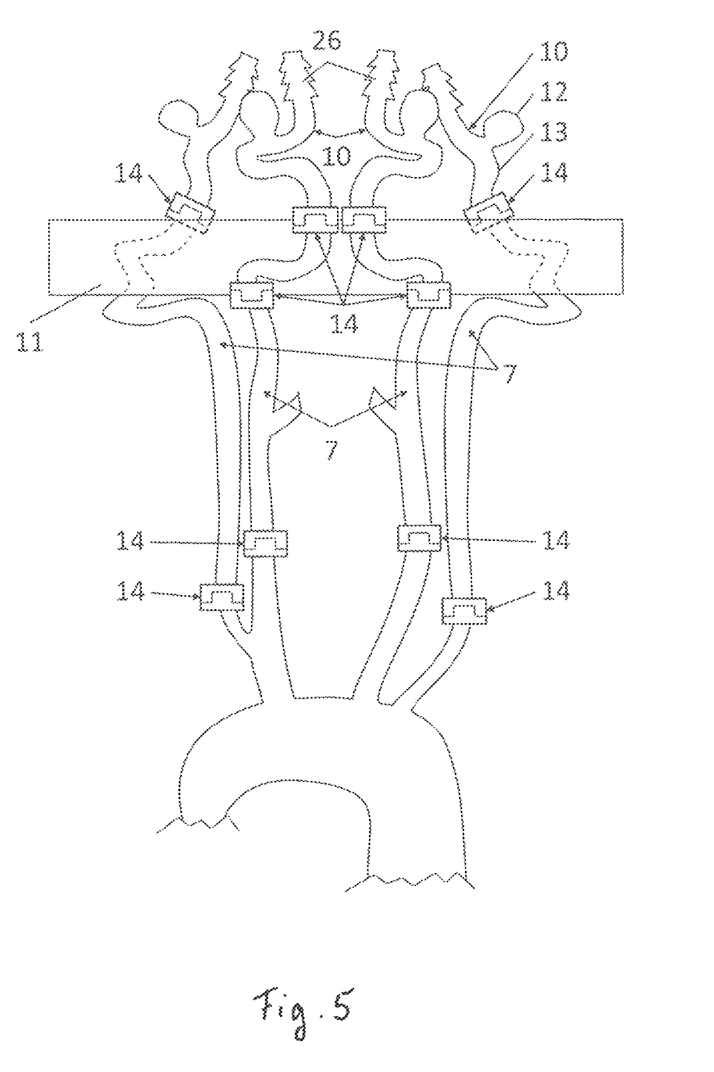

As FIG. 5 shows, a plurality of transitions (e.g., transitions 22, 23 shown in FIGS. 2-4) with patient-specific geometry can be implemented via interfaces, each of which can be detachably connected to the fluid system 2 (shown in FIG. 1) by means of quick couplings 14. All quick couplings 14 can have a constant or also variable standardized diameter in the transition (e.g., diameter d1 of transitions 22, 23 shown in FIG. 4).

With the connection technique according to the invention, it is therefore possible to replicate several arterial sections of fluid lines spaced apart from each other as passageways, which makes it possible to position several vessel models at the same time. Different positions of the aneurysms can be simulated, because not all brain sections are equally affected by aneurysms. With the quick coupling 14 according to the invention, several pathological or healthy vessels can be positioned/mounted one after the other and/or replicated in the area of dividing points. Affected diseased vessel sections can be replicated in the model according to original patient data. Models with one or more aneurysms 12 are possible and can also be replicated in the region of dividing points.

For a return flow in the fluid system 2, the vessel models 10 downstream of at least one saccular area 12 may carry known connection elements 26 at their ends to be connectable to the fluid system 2. The fluid system 2 can be designed to simulate the human blood circulation system with respect to temperature, pressure and viscosity of the fluid in a known manner.

In FIG. 5, the neuro-flow pathways 7 are depicted and function to convey simulated blood flow to the modular regions of the training model. The skull base model 11 provides structural support and anatomical positioning for the vessel models 10 within the training system. The lumen of the vessel 13 represents the internal fluid channel that replicates the patient-specific vascular anatomy and enables fluid communication between the fluid system 2 (shown in FIG. 1) and the vessel models.

The invention has been described above using a neuro-interventional training model as an example. The invention can also be implemented in any medical training model in which patient-specific or standardized blood vessel models are to be placed in interchangeable training method exercise regions. The same applies to training models that are used as treatment models/simulation models for, for example, scientific purposes, research purposes, for developing instruments, etc.

The invention claimed is:

1. A medical training model, comprising:
   a base frame;
   a fluid system arranged on the base frame and configured to simulate a blood circulation replacement system;
   at least one individualized vessel model, wherein the at least one individualized vessel model is additively manufactured and comprises a patient-specific replicated lumen; and
   at least one hydraulic quick coupling configured to interchangeably connect the at least one individualized vessel model in at least one training region to the fluid system;
   wherein the at least one hydraulic quick coupling comprises coupling pieces including a plug and a sleeve or bushing, each of the coupling pieces having an inner flow channel for sealed connection when the coupling pieces are joined together;
   wherein at least one of the coupling pieces is designed as an adapter on a connection side of the at least one individualized vessel model, the adapter comprising the inner flow channel having a diameter-changing flow channel course that connects the patient-specific replicated lumen of the at least one individualized vessel model to a standardized coupling connection opening;
   wherein the coupling pieces form coupling bodies lying against each other in a locked coupling position, and wherein end stops are provided for an opening diameter variance of the standardized coupling connection opening;
   wherein the diameter-changing flow channel course of the inner flow channel comprises a conical region providing an edgeless transition between the patient-specific replicated lumen and the standardized coupling connection opening;
   wherein the patient-specific replicated lumen of the at least one individualized vessel model has a clear width (d2) and the standardized coupling connection opening is formed with a standardized diameter (d1); and
   wherein the conical region is formed in a reducing or widening manner as a hollow shaft truncated cone for a flat bearing on a supply surface.

2. The medical training model according to claim 1, wherein the at least one hydraulic quick coupling is a manually releasable mechanical connection, wherein each of the coupling pieces comprises a sealing surface on a side facing another coupling piece, and a sealing ring is arranged between the sealing surfaces.

3. The medical training model according to claim 1, wherein the plug and socket or bushing are cylindrical and each accommodate an axial flow channel, and wherein the at least one hydraulic quick coupling is configured as a flat-sealing or flush-sealing coupling.

4. The medical training model according to claim 1, wherein the at least one individualized vessel model is detachably and anatomically positioned on at least one skull base model with an integrable holder, wherein the at least one skull base model is formed as a solid body block with internal channels inversely reproducing human arteries with patient-specific geometry, wherein the internal channels are guided outwardly at both ends into tubular connection points, each forming a respective coupling piece of the at least one hydraulic quick coupling.

5. The medical training model according to claim 4, wherein the solid body block is made of a lost mold casting compound or by an additive manufacturing process.

6. The medical training model according to claim 1, wherein the at least one training region comprises a plurality of training regions with patient-specific geometry, wherein the plurality of training regions are implemented via interfaces, each interface being detachably connected to the fluid system by means of the at least one hydraulic quick coupling and having a variable or constant diameter in the edgeless transition.

7. The medical training model according to claim 1, wherein the fluid system is configured to simulate the blood circulation replacement system by providing a fluid at a temperature and a pressure representative of human blood circulation.

* * * * *